United States Patent [19]

Franklin

[11] Patent Number: 4,979,702
[45] Date of Patent: Dec. 25, 1990

[54] APPARATUS FOR OPENING AND CLOSING A SEALED SLOT

[76] Inventor: William L. Franklin, 22029 - 49th Ave. SE., Bothell, Wash. 98021

[21] Appl. No.: 342,615

[22] Filed: Apr. 24, 1989

Related U.S. Application Data

[63] Continuation of Ser. No. 13,356, Nov. 11, 1987, abandoned.

[51] Int. Cl.⁵ .............................................. B64C 1/14
[52] U.S. Cl. .................................. 244/129.4; 24/385; 24/386; 24/415; 24/437; 24/442; 89/36.14
[58] Field of Search ................. 244/213, 214, 215, 46, 244/129.4, 129.3, 129.1; 24/385, 386, 415, 416, 417, 427, 437, 442; 89/36.14

[56] References Cited

U.S. PATENT DOCUMENTS

| | | | |
|---|---|---|---|
| 2,353,086 | 7/1944 | Schaaff | 89/36.14 |
| 2,365,578 | 12/1944 | Morin | 89/36 |
| 2,394,732 | 2/1946 | Williams et al. | 24/385 |
| 2,472,156 | 6/1949 | Gerber | 244/129.4 |
| 3,696,472 | 10/1972 | Perina et al. | 24/427 |

FOREIGN PATENT DOCUMENTS

| | | | |
|---|---|---|---|
| 14964 | 9/1980 | European Pat. Off. | 24/415 |
| 507975 | 9/1930 | Fed. Rep. of Germany | 24/427 |
| 239472 | 9/1925 | United Kingdom | 24/427 |
| 312621 | 5/1929 | United Kingdom | 24/427 |
| 1150784 | 4/1969 | United Kingdom . | |

*Primary Examiner*—Joseph F. Peters, Jr.
*Assistant Examiner*—Anne Sartelle

[57] ABSTRACT

A cover assembly for sealing a slotted opening about a shaft which moves across the opening; and in particular for sealing an opening in the fuselage of an aircraft which accommodates a movable flap support tube. The closure assembly includes a pair of material sections which cover the opening, and each having a fastener element such as a zipper track or magnetic strips or the like, along its inner edge. The fastener elements are joined together by a closure device which includes a pair of spaced apart rollers which engage the tracks and cause them to interlock during movement of the closure device with the support tube. Opening of the zipper tracks is caused by a wedge on the closure device which causes the interlocked tracks to separate. The rollers and wedge are mounted on a main plate which is fitted about the movable support tube. In another embodiment there is provided a closure device for separating and joining fastener elements, such as zipper tracks or magnetic strips or the like, by means of a first pair of spaced apart rollers which join the fastener elements when the device is moved in a first direction, and a second pair of opening rollers which separate the fastener elements when the device moves in the opposite direction. In another embodiment, the opening rollers are replaced by a wedge.

13 Claims, 7 Drawing Sheets

APPARATUS FOR OPENING AND CLOSING A SEALED SLOT

This is a continuation of application Ser. No. 013,356 filed Nov. 11, 1987, now abandoned.

TECHNICAL FIELD

The present invention pertains to apparatus and methods for opening and closing a slot by separating and rejoining two or more material sections, and more particularly to apparatus and methods for opening and closing a slot in an aircraft cavity utilized for the movement of a flap actuating torque tube therein.

BACKGROUND OF THE INVENTION

Conventional zippers are commonly used for separating and recombining fabric pieces such found as on men's trousers, in order to provide a sealable aperture. This is accomplished in the conventional zipper by means of a wedge opening portion which separates the adjoining tracks of the zipper, and a closing channel portion which joins the tracks together in interlocking engagement.

A zipper arrangement has been used conventionally to provide a movable seal about the gun barrel of a movable turret. For example, in U.S. Pat. Nos. 2,331,048 and U.S. Pat. No. 2,353,086 by Schaaff, there is disclosed a zipper assembly for combining and separating fabric-like flaps about the barrel of a movable gun; the zipper assembly including a flange which is mounted about the gun barrel and which has upper and lower zipper slider members for combining and separating a pair of zipper tracks which are attached to the fabric sections. Similarly, in U.S. Pat. No. 2,344,049 and U.S. Pat. No. 2,365,578 by Morin, there are disclosed a zippered fabric arrangement for providing a sealed aperture about the barrel of a movable gun, utilizing a slider body having an opening wedge member and a closer channel at each end for combining and separating the fabric sections.

Similar zippered assemblies for sealing around the barrel of a movable turret have also been disclosed in U.S. Pat. No. 2,392,685 and U.S. Pat. No. 2,393,551 by Morin, as well as U.S. Pat. No. 2,394,732 by Williams et al.

Another assembly for providing an aperture seal about a movable gun barrel is disclosed in U.S. Pat. No. 3,710,681 by Koontz whereby the seal is formed by a number of resilient fingers which may be resiliently pulled apart by a gun barrel or the like to permit movement of the gun barrel in the desired direction.

Yoneya, in U.S. Pat. No. 4,027,361 discloses an aperture seal for the shift lever of an automobile transmission; the seal including opposing zipper slide members for opening and closing a pair of fabric sections about the shift lever.

Other closure assemblies include U.S. Pat. No. 3,111,735 by Ellis, which discloses a pair of magnetic tracks attached to separate fabric sections such as found in wearing apparel or shoes, and which are manually separated and rejoined. In addition, in U.S. Pat. No. 3,478,404 by Plummer there is disclosed a device for closing a pair of adjacent seams which have oppositely facing tongue and grooves.

SUMMARY OF THE INVENTION

It should be appreciated that the aforementioned conventional zipper assemblies have a number of common features, including the use of a movable channel to cause the adjoining tracks of the zipper to interlock into engagement. A common failure of conventional Zippers is to jam when exposed to a sandy environment.

It is an object of the present invention to provide a mechanism for separating and combining a pair of fabric sections, and particularly when the mechanism is exposed to a gritty or sandy environment. In an exemplary embodiment, the present invention pertains to an assembly for covering the opening in the outer skin surface of an aircraft, the opening providing a space for the movement of a torque tube which supports a trailing edge flap of the aircraft.

In the present invention there is provided apparatus for covering an opening defined by a plane having a lengthwise axis and a transverse axis. The opening contains therein a member, such as a torque tube supporting a trailing edge flap, which is movable in a generally lengthwise direction within the opening. The apparatus includes material means for covering the opening. The material means includes a first material portion which has a first fastener element which is located in the lengthwise direction along an edge of the first material portion. Furthermore, the material means includes a second material portion which has a second fastener element which is located in the lengthwise direction along an edge of the second material portion. The material means covers the opening in a manner that the movable member is located between the first fastener element and the second fastener element. The apparatus also includes closure means which are connected to the movable means for movement therewith in the lengthwise direction. The closure means includes means for joining the first and second fastener elements together in a closing mode so as to cover the opening. The joining means includes first and second roller members which are spaced apart a selected distance to rotatably engage the first and second fastener elements so as to urge the first and second fastener elements together in a fastening relationship during the movement of the movable member in the lengthwise direction. Also included in the closure means are means for separating the first and second fastener elements to permit the lengthwise movement of the movable member between the first and second fastener elements.

In another exemplary embodiment, the present invention pertains to apparatus for covering an opening. The apparatus includes material means for covering the opening; the material means including a first material portion which has a first fastener element located along its edge, and a second material portion which has a second fastener element located along its edge. The joining means includes first and second roller members which are spaced apart a selected distance to rotatably engage the first and second fastener elements so as to urge the first and second fastener elements together in a fastening relationship during movement of the closure means in the lengthwise direction. The apparatus also includes closure means for separating and rejoining the first and second material portions.

BRIEF DESCRIPTION OF THE DRAWINGS

These and other objects and advantages of the present invention will become more readily apparent upon reading the following Detailed Description and upon reference to the attached drawings of which.

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION

Figure 1:
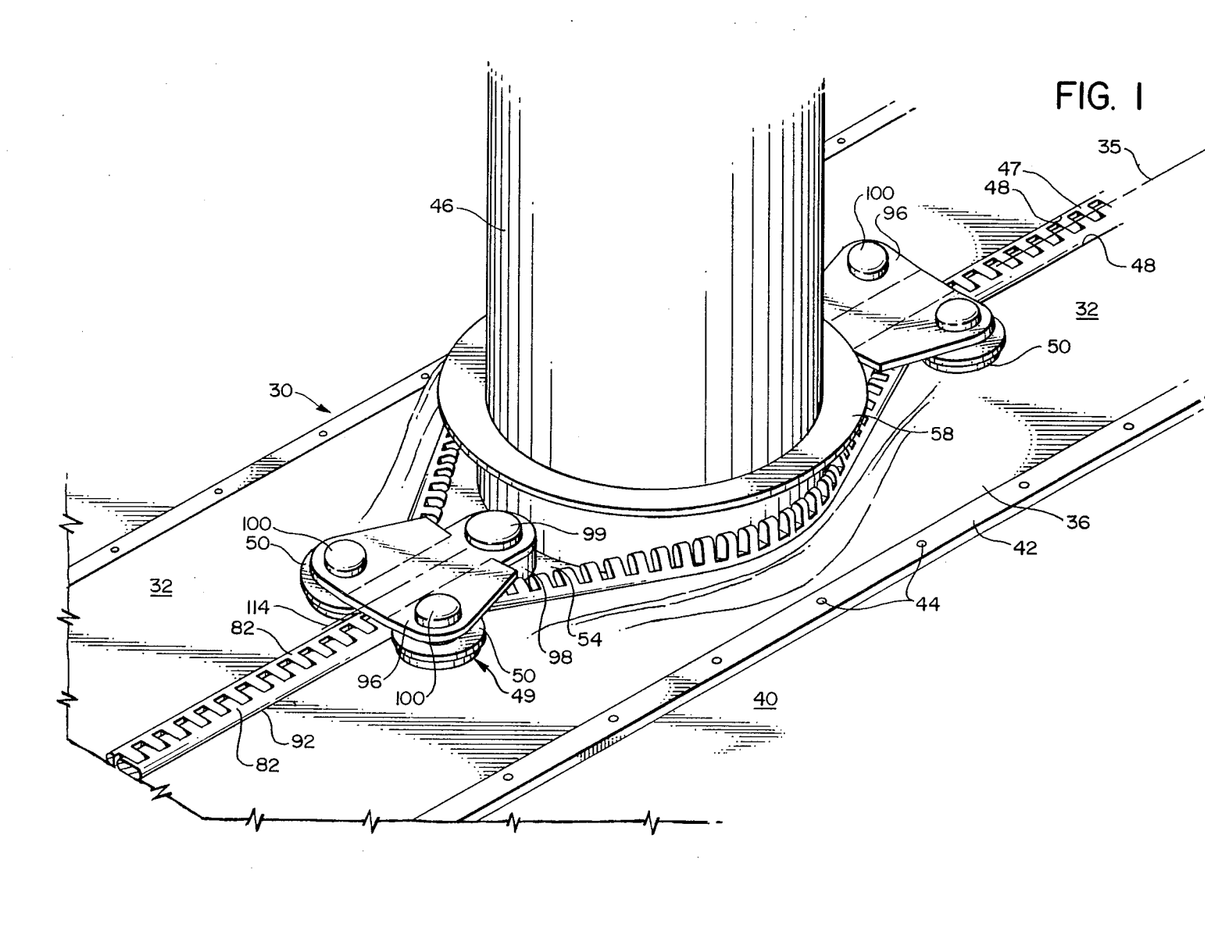
FIG. 1 is an isometric view of a first embodiment of the present invention.
Figure 2:
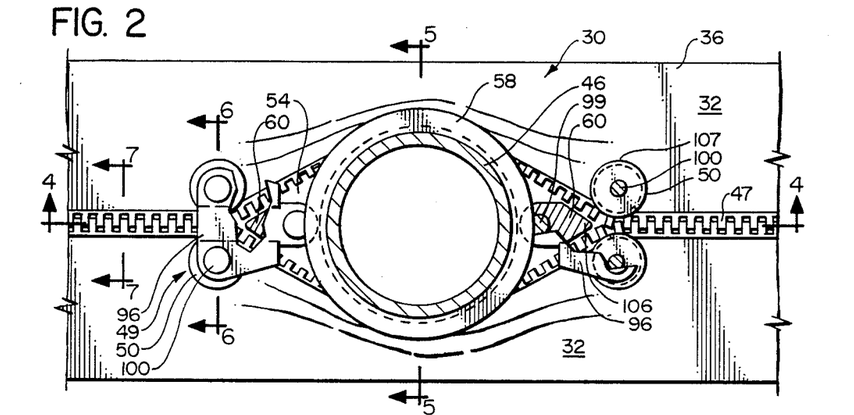
FIG. 2 is an interior plan view of the first embodiment.
Figure 3:
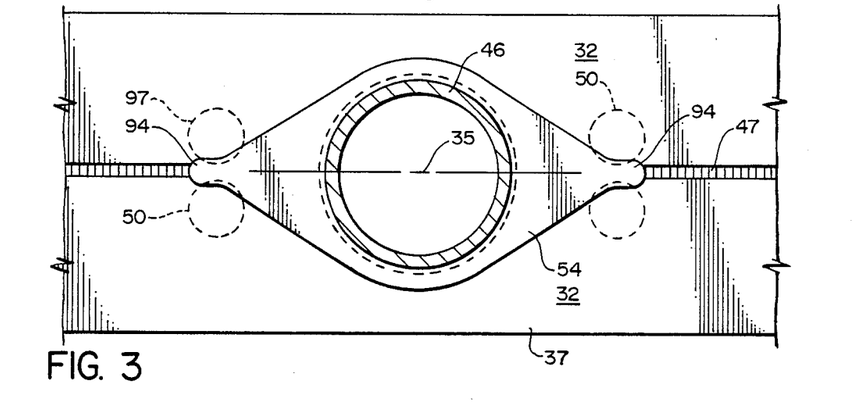
FIG. 3 is an exterior plan view of the first embodiment.
Figure 4:
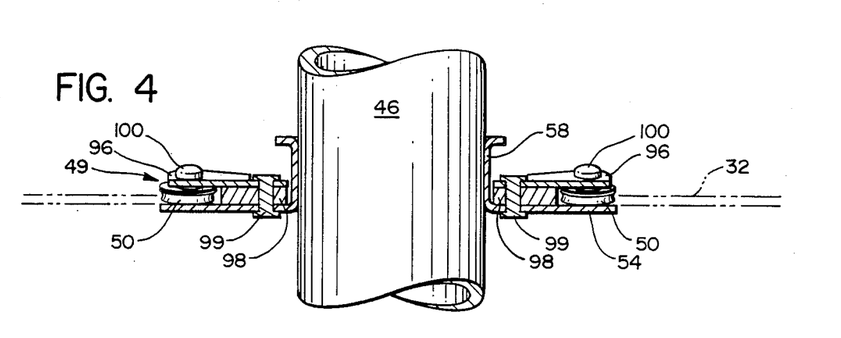
FIG. 4 is a side sectional view of the first embodiment taken along lines 4—4 of FIG. 2.
Figure 5:
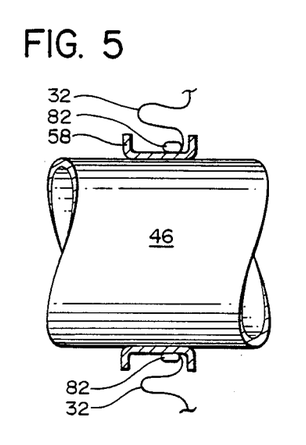
FIG. 5 is a sectional view of the first embodiment taken along lines 5—5 of FIG. 2.

In a first exemplary embodiment shown in FIG. 1, the invention broadly includes a sealing assembly generally indicated at 30 which includes first and second material portions 32 which are separated along a lengthwise axis indicated by a line 35; the material portions 32 preferably being formed from a flexible shielding fabric such as nylon cloth. The material portions each include an inside protected surface 36 (FIG. 2), and an outside exposed surface 37 (FIG. 3). The sealing assembly is mounted about an opening in a surface 40 (FIG. I) of a structural assembly (only a portion of which is shown in FIG. 1) by means of a rectangular bracket 42. Bracket 42 sandwiches the edges of the material portions 42 against the outer edges of the surface 40 around the opening the bracket 42 being secured to the surface 40 by means of a number of perimeter rivets 44.

Extending through the opening in a manner generally perpendicular to surface 40 is a shaft 46 which is caused to move in a lengthwise direction along axis 35 by mechanical means which are not shown. In order to retain the material portions 32 about the shaft 46 so as to seal the opening, a zipper chain 47 is attached to the inward edges 48 of the fabric portions 32 along the axis 35. The individual tracks of the zipper chain are joined together by a closure device indicated at 49 which includes left and right pairs of opposing rollers 50 which are rotatably mounted to a main support plate 54 (FIG. 3). The main plate 54 includes an annular collar 58 through which the shaft 46 extends. Separation of the opposing tracks is accomplished by left and right wedges 60 (FIG. 2), which are also mounted to left and right ends of the main plate 54. As the shaft 46 is caused to move in a rightward direction, for example, when viewing FIG. 2, the right wedge 60 separates the zipper tracks ahead of the shaft 46, while the left rollers 50 close the zipper tracks behind the shaft. In this manner, the opening remains sealed around the shaft 46 at all times.

Figure 8:
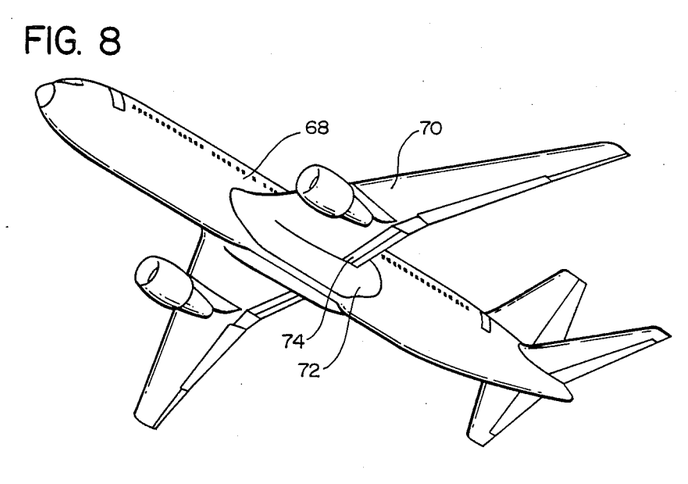
FIG. 8 is a pictorial view of an aircraft which incorporates the present invention in a second embodiment.
Figure 9:
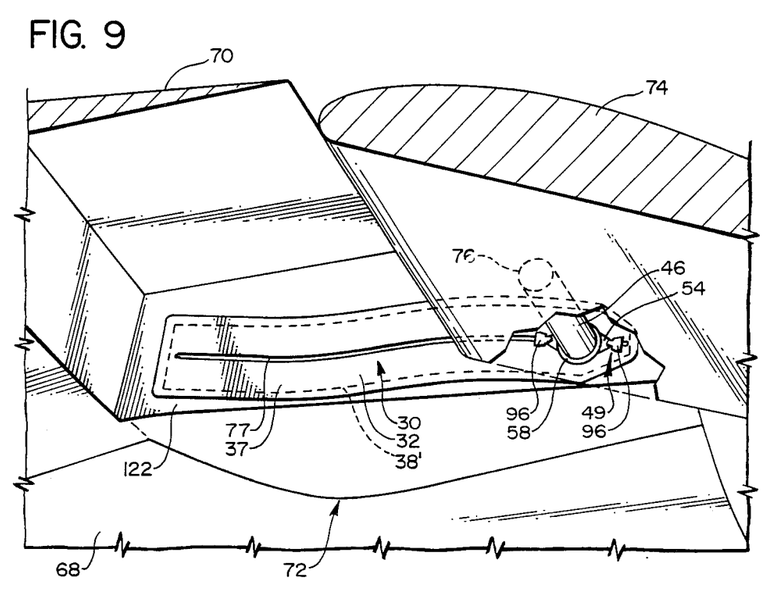
FIG. 9 is a more detailed isometric view of the second embodiment of the present invention.
Figure 10:
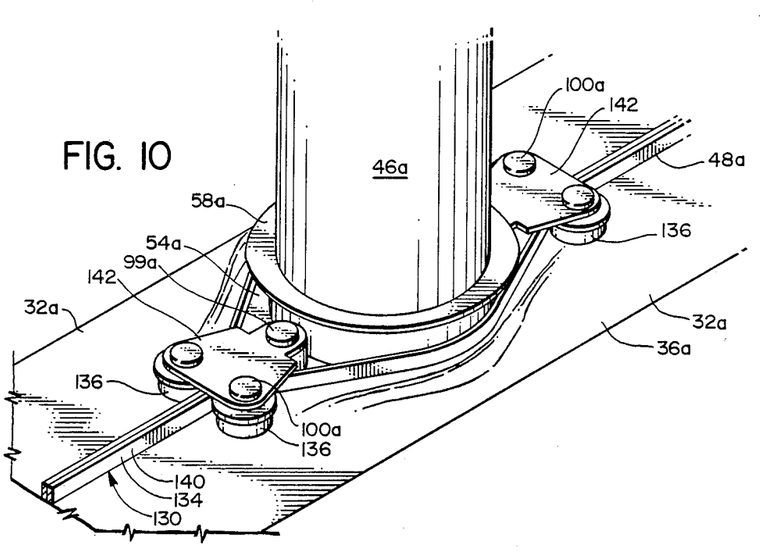
FIG. 10 is an interior isometric view of a third embodiment of the present invention.
Figure 11:
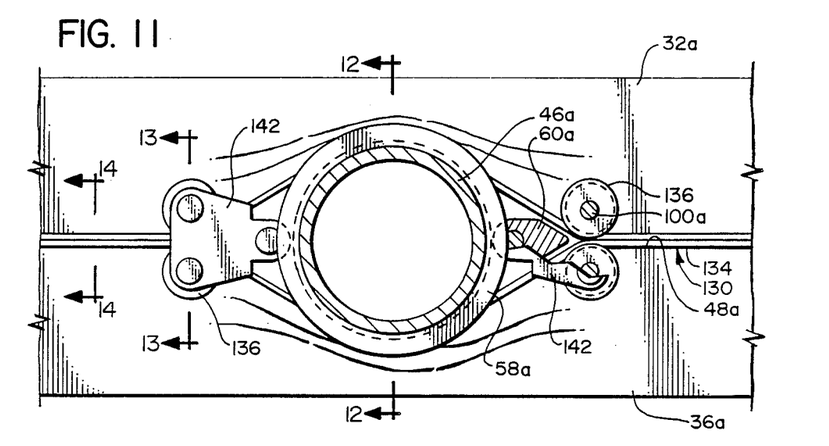
FIG. 11 is an interior plan view of the third embodiment of the present invention.
Figure 12:
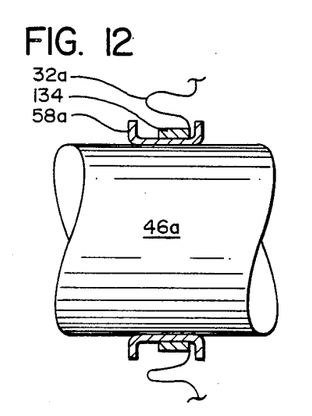
FIG. 12 is a side sectional view of the third embodiment of the present invention taken along lines 12—12 of FIG. 11.
Figure 13:
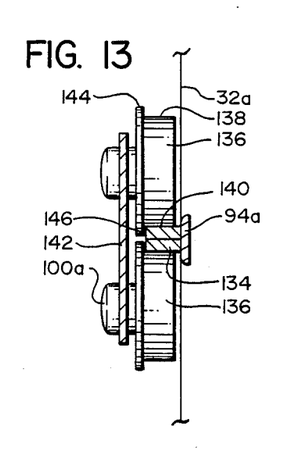
FIG. 13 is a side sectional view of the third embodiment taken along lines 13—13 of FIG. 11.
Figure 14:
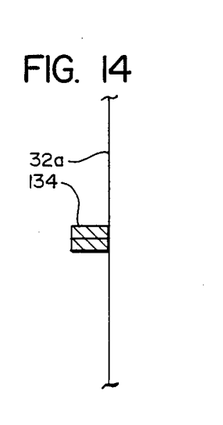
FIG. 14 is a sectional view of the third embodiment taken along lines 14—14 of FIG. 11.

In an exemplary embodiment of the present invention, the closure mechanism is utilized to seal an opening in the fuselage of an aircraft. More particularly, as shown in FIGS. 8 and 9, the aircraft includes a fuselage 68 and a wing 70. A skin around the location where the wing joins the fuselage is known as a wing-to-body fairing and is designated by the number 72. An inboard trailing edge flap 74 of the wing is extended and retracted by means of a hydraulic motor located inside the wing-to-body fairing 72. The motor is connected to the flap 74 by means of a torque tube 76 which extends in a spanwise direction through a rectangular opening 77 in the fairing 72; the opening 77 (FIG. 9) extending in a generally fore and aft direction on a vertical side portion of the fairing 72.

During extension and retraction of the flap 74, the torque tube 76 moves in a fore and aft direction within the opening 77. Since it is desirable that the opening 77 remain sealed around the torque tube 76 to protect the components inside the wing-to-body fairing as well as to reduce the drag caused by airflow around the opening, the closure device 30 completely covers the opening 77. In furtherance of this, the torque tube 76 is tightly engaged within the collar 58 in the main plate 54 so that fore and aft movement of the torque tube 76 causes the separate fabric sections 32 to remain joined over the opening.

Having described the principal features of the present invention and their exemplary use for sealing the opening of an aircraft surface, attention is now turned to the remaining features of the present invention. As further shown in FIGS. 1 through 7, there is provided the conventional zipper chain 47 (FIG. 1), which in an exemplary embodiment is a standard nylon coil chain; the coil being formed by opposing chain tracks 82 which are attached to the inner edges 48 of the material sections 32. The zipper chain 47 is attached to the material sections 32 so that the pair of opposing zipper tracks 82 which form the zipper chain extend upward from the inside surfaces 36 of the material sections. In this manner, there are provided outer vertical edges 92 of the tracks 82 which are engaged by the roller pairs 50 to cause the zipper tracks to interlock in a closing mode.

This is further accomplished by mounting the roller pairs 50 to respective horizontal support flanges 96 (FIG. 1) which extend above and transversely across the chain 47. The support flange 96 in turn is rigidly connected to a vertical pedestal 98 which is pivotally connected at its lower end to the main plate 54 by means of a vertical pin 99. This permits a slight transverse movement of the roller pairs 50 in the event the path of the shaft 46 is slightly offset from the lengthwise axis 35 of the zipper. For ease of explanation, the components which are attached to the right end of the main plate 54 will be described, appreciating however, that the components which are attached to the left end of mainplate 54 are identical to those at the right end.

In order to impart an inward transverse closing force to the zipper tracks 82 (FIG. 1), the rollers 50 are rotatably mounted to respective vertical pins 100 which in turn are rigidly connected to and depend downward from the support flange 96. The rollers 50 are spaced apart from each other a selected transverse distance so that when they engage the zipper track edges 92 during lengthwise movement of the shaft 46, the zipper tracks are caused to interlock.

The zipper track edges 92 are maintained in engagement with the rollers 50 by means of a spur portion 94 (FIGS. 3 and 6) of the main plate 54 which extends in a lengthwise direction along axis 35 outward from the collar 58 to a location slightly outward of the outward edges 97 of the rollers 50. In this manner, the zipper tracks 82 are held against the upper surface of the spur portion 94 so that he zipper tracks 82 are retained in engagement with the rollers 50. Further engagement of the zipper tracks 82 with the rollers 50 is aided by the concave outer circumferential edges (FIG. 6) of the rollers.

Separation of the zipper tracks about the shaft 46 when moving in a lengthwise direction is accomplished by the separator wedges 60 (FIG. 2) which extend outwardly along the axis 35 from the pedestal 98. Each wedge extends in a vertical direction between the plate 54 and the support flange 96, and has a triangular configuration with an outward pointed portion 106 (FIG. Z) which is located slightly inward of the inward surfaces 107 of the rollers 50, and well outward of the collar 58. In this manner, the wedge separates a segment of the zipper track chain ahead of the shaft 46, yet the amount of lengthwise separation is limited by the rollers 50 which hold the zipper tracks together. Furthermore, to facilitate the lengthwise movement of the closure device 49, as well as to guide the open portions of the zipper about the shaft 46 (FIG. 1), the cylindrical collar 58 extends vertically from the plate 54.

Figure 6:
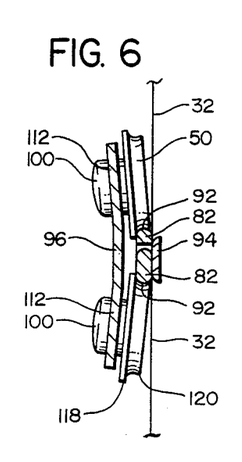
FIG. 6 is a sectional view of the first embodiment taken along lines 6—6 of FIG. 2.
Figure 7:
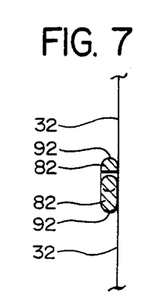
FIG. 7 is a sectional view of the first embodiment taken along lines 7—7 of FIG. 2.

As shown more clearly in FIG. 6, the support flange 96 is formed by opposing slanted portions 112 which extend away from the material sections 32 in opposite directions at an angle of about 5° to elevate a majority of the lower surface of the rollers above the material sections 32. This eliminates the rubbing of the rollers along the material sections 32 and facilitates lengthwise movement of the closure device 49.

As shown more clearly in FIG. 6, the concave configuration of the outer circumferential edges of the rollers 50 forms a pair of annular lips 118, 120 around each roller, with the outer edge 92 (FIG. 1) of the zipper track being engaged between the lips 118, 120. The outer annular lip 118 which is furthest from the material sections 32 has a greater radial diameter than the inner lip 120. In this manner the zipper is engaged between the roller outer lip 118 and the spur 94 thereby preventing vertical movement of the zipper tracks 82 and disengagement from the rollers 50.

As discussed previously, in an exemplary embodiment the sealing assembly 30 covers an opening 77 in the wing-to-body fairing 72 (FIG. 9) of an aircraft. In this embodiment, the opening 77 is located along a vertical surface 122 which extends in a fore and aft direction along the aircraft; the surface being in close proximity to an inboard fore and aft vertical surface of the trailing edge flap 74. In order to extend and retract the flap 74, the spanwise extending torque tube 76 is caused to move in a fore and aft direction along a path which is slightly undulating. The sealing assembly 30 seals the opening 77 formed in the wing-to-body fairing 72. Furthermore, the zipper track 47 is formed to have an undulating lengthwise configuration which corresponds to the path of the torque tube 76 to facilitate opening and closing of the zipper chain.

It should be appreciated that the present embodiment is not limited to covering the opening in an aircraft surface. Other applications of the present invention include, for example, its use as a movable seal around the gun barrel of a movable turret.

In another exemplary embodiment, elements shown in FIGS. 10 through 14 which are the same as elements described in the previous embodiment, are designed with like numerals with the suffix "a" attached. In this embodiment, the zipper tracks (FIG. 10) are replaced by magnetic strips indicated at 130. Each magnetic strip includes a lengthwise edge 134 which is attached to the edge 48a of the material section 32a, and which extends upward from the inside surface 36a of the material section 32a.

The magnetic strips 130 are joined together by opposing rollers 136 (FIG. 13) which are connected to the pivot pins 100a. Unlike the previous embodiment, the rollers 136 have flat outer circumferential surfaces 138 (FIG. 13) which are parallel to the outer vertical surfaces 140 of the magnetic strips. This is achieved by the fact that the pivot pins 100a are mounted in a perpendicular manner to a support flange 142. The support flange 142 has a planar configuration and replaces the angled support flange 96 of the previous embodiment. Furthermore, each roller 136 includes an upper circumferential lip 144 (FIG. 13) which has a greater diameter than the roller outer surface 138 and which extends across the upper tips 146 of the magnetic strips. In this manner, the rollers 156 are supported slightly above the material sections 32a with the magnetic strips engaged between the roller lip 144 and the spur 94a of the main support plate 54.

A primary advantage of the present invention is utilization of the rollers 50 to rejoin the material sections. Unlike conventional zipper assemblies which utilize channeled enclosures, the rollers of the present invention are not as susceptible to malfunctioning due to dirt and debris which can accumulate on the tracks.

Figure 15:
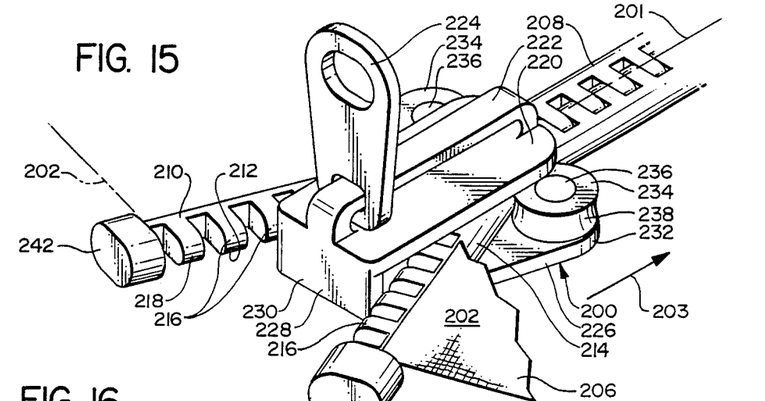
FIG. 15 is an isometric view of a fourth embodiment of the present invention.
Figure 16:
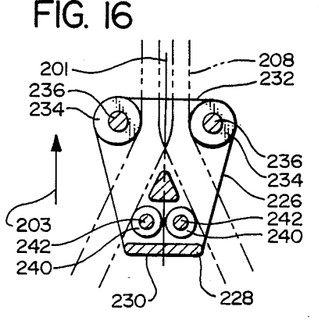
FIG. 16 is a top sectional view of the fifth embodiment of the present invention.
Figure 17:
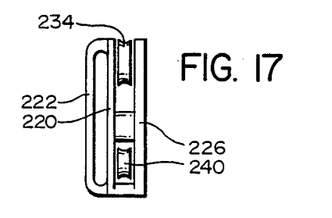
FIG. 17 is a side view of the fifth embodiment of the present invention.

In another exemplary embodiment of the present invention there is shown in FIGS. 15 through 17 a closure assembly indicated at 200 having a central lengthwise axis designated by a line 201. The closure assembly joins two or more material sections 202, such as the flaps of a tent shown in FIG. 23. In the present invention, the closure assembly is mounted for movement along the axis 201 (FIG. 1) in a forward opening direction designated by an arrow 203, and in an opposing closing direction. The material sections 202 include respective outer surfaces 206 (FIG. 15) which are normally exposed to the environment, and respective protected inner surfaces (not shown). The material sections each include a conventional zipper track 208 such as a nylon coil mounted along their opposing inner edges. The zipper track 208 (FIG. 1) includes an upper surface 210, a lOWer surface 212, an outer vertical edge surface 214 which extends between the upper and lower surfaces, and a number of inwardly extending tabs 216 which are spaced apart and which interlock in a closed mode to join the material sections together. The zipper tracks 208 are attached to the material sections 202 adjacent to the upper surfaces 210 so that the outer edges 214 of the tracks extend downward from the material sections 202.

The closure assembly 200 is formed by an upper rectangular flange 220 (FIG. 15) having an inverted U-shaped connector bracket 222 mounted to the upper surface of the flange. A pull tab 224 is pivotally mounted to the connector bracket 222 to facilitate manual movement of the closure assembly 200 along the zipper tracks.

The closure assembly 200 is further formed by a lower horizontal flange 226 which is connected at an opening end 228 to the upper flange by means of a vertical endwall 230. The lower flange 226 flares outwardly and away from the opening end 228 to a closing end 232.

Closing of the zipper tracks 208 is accomplished by a pair of closing rollers 234 which are mounted to the closing end 232 of the lower flange by means of vertical pins 236. The rollers 234 have outer circumferential concave surfaces which engage the outer vertical edges 214 of the zipper tracks. In order to cause the zipper tracks to interlock during lengthwise movement of the closure assembly, the rollers 234 are spaced apart from each other at opposite sides of said lengthwise axis 201 at a transverse distance which is substantially equal to the separation of the zipper outer vertical edges 214 when in the closed mode. During movement of closure assembly 200, the material sections 202 pass between the lower surface of the upper flange 220 and the upper surfaces of the rollers 234.

Separation of the zipper tracks when the closure assembly 200 is moved in an opening direction indicated by the arrow 203, is accomplished by a second pair of rollers 240 (FIG. 16) which are attached to the lower flange near its opening end 228 by means of vertical pivot pins 242 which extend between the upper and lower flanges. During lengthwise movement of the closure assembly, the rollers 240 are caused to rotate in opposite directions. To facilitate separation of the zipper tracks, the opening rollers 240 are mounted closer to the centerline 201 than the closing rollers 234. Furthermore, each opening roller 240 has an outer circumferential concave surface for engaging the inner surfaces 218 of the zipper tabs 216. To further facilitate rotation of the opening rollers 240 along the zipper tabs 216, the diameter of each opening roller 240 exceeds the distance between adjacent tabs 216.

In order to prevent the closure assembly 200 from being disengaged from the zipper tracks, a cap 242 is connected to each end of the zipper tracks. The cap 242 has a larger vertical dimension than the distance between the lower surface of upper flange 220 and the upper surface of lower flange 226 to accomplish this purpose.

Figure 18:
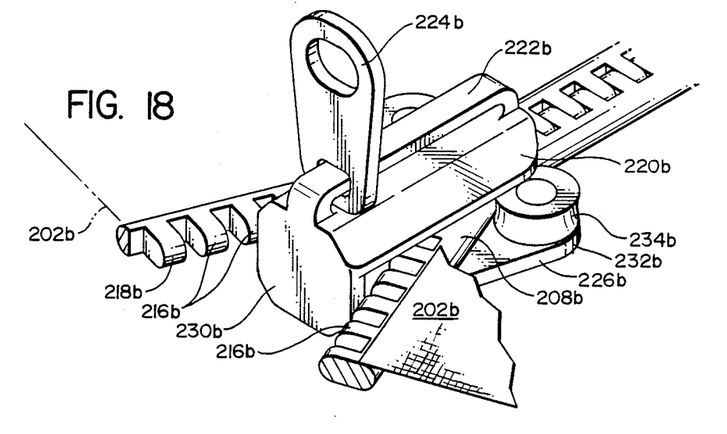
FIG. 18 is an isometric view of a sixth embodiment of the present invention.
Figures 19, 20, 21, 22, 23:
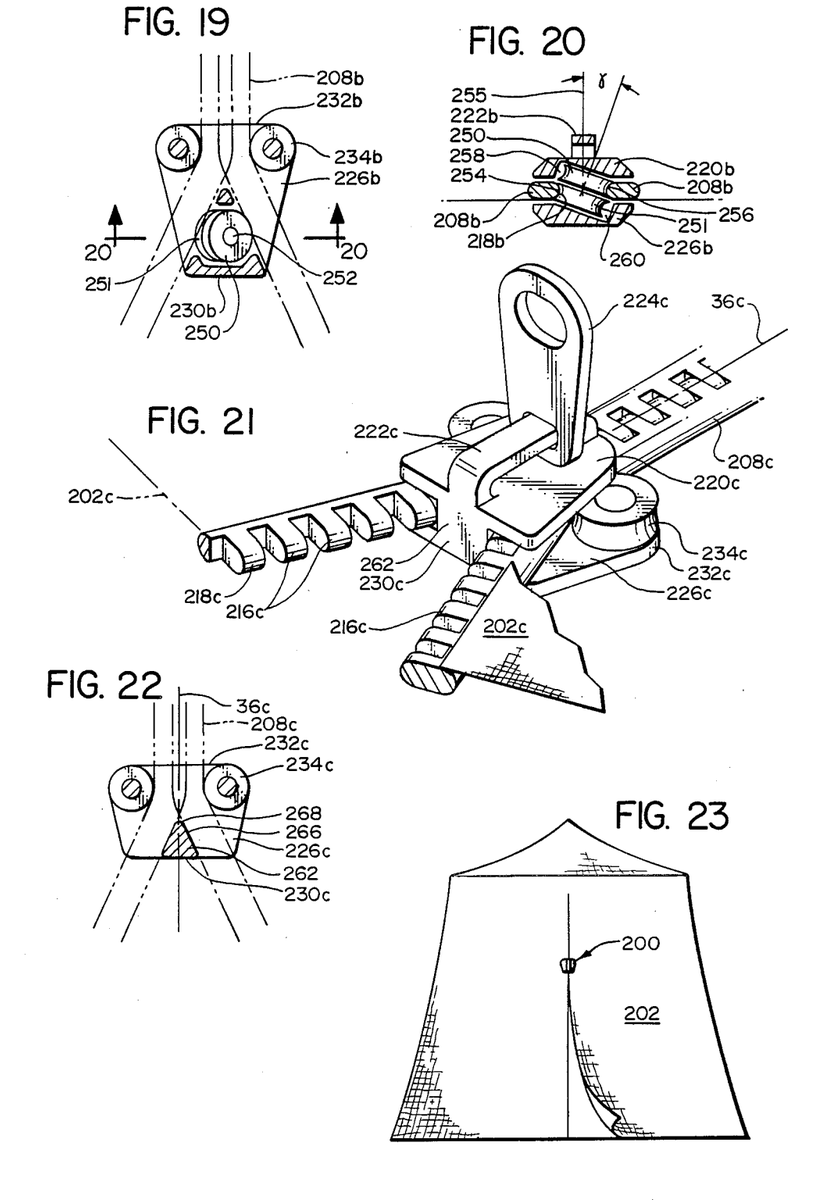
FIG. 19 is a top sectional view of the sixth embodiment of the present invention.
FIG. 20 is a side sectional view of the sixth embodiment of the present invention taken along lines 20—20 of FIG. 19.
FIG. 21 is an isometric view of a seventh embodiment of the present invention.
FIG. 22 is a top sectional view of the seventh embodiment of the present invention.
FIG. 23 is a pictorial view of an exemplary application of the fourth through seventh embodiments.

In another embodiment of the present invention shown in FIGS. 18 through 20, like elements described in the previous embodiment are assigned like numerals with the suffix "b" attached. In the present embodiment, the opening rollers 240 (FIG. 16) are replaced by another pair of upper, lower opening rollers 250, 251 (FIG. 19), Which are mounted one on top of the other. This allows the diameter of the rollers 250, 251 to be maximized in order to facilitate movement of the rollers along the inner surfaces 218b of the zipper tracks 208b. This is further accomplished by mounting the rollers 250, 251 on a pivot pin 252 which extends between the upper flange 220b and lower flange 226 b at an angle γ (FIG. 20) of about 30° to an imaginary vertical reference axis 255. In this manner, the rollers 250, 251 are tilted so that the left side 254 of the lower roller 251 engages the left zipper track, and the right side 256 of the upper roller 250 engages the right zipper track 208b. More particularly, the upper roller 250 is mounted at about 30° to an imaginary horizontal reference plane so that the left side is located upward and leftward from the right engaging side 256. In addition, the lower surface of the upper flange 220b includes a recessed cavity 258 for accommodating the upwardly extending left portion of the upper roller 250.

On the other hand, the lower roller 251 which is mounted parallel to the upper roller for rotation about the pivot pin 252, extends downward and rightward from its right engaging end 254. The right portion of the lower roller 251 is accommodated in a recessed cavity 260 of the upper surface of the lower flange 226b. In this manner, the left end 254 of the lower roller 251 is horizontally aligned with the tab inner surface 218b of the left zipper track, and the right end of the upper roller 250 is horizontally aligned with the tab inner surface 218b of the right zipper track.

In a further exemplary embodiment of the present invention shown in FIGS. 21 and 22, like elements described in the previous embodiments are assigned like numerals with the suffix "c" attached. In the present embodiment, the opening rollers 250, 251 (FIG. 19) are removed and the wall 230b is replaced by a triangular shaped wedge 262 (FIG. 22) which extends vertically between the upper flange 220c and the lower flange 226c at the opening end 230c. The wedge 262 includes a pair of sidewalls 266 which taper towards each other in the direction of the closing end 232c to form a converging nose 268. During opening movement of the closure assembly, the sidewalls 266 engage the inner surfaces 218c of the zipper tabs 216c to cause their separation.

What is claimed is:

1. Apparatus for covering an opening having a lengthwise axis and a transverse axis, the opening containing therein a member which is movable in a generally lengthwise direction within the opening, the apparatus comprising:
   a. material means for covering the opening, the material means including
      (1) a first material portion which has a first fastener element which is located in the lengthwise direction along the first material portion, the first material portion including a first surface and an opposing second surface, and (2) a second material portion which has a second fastener element which is located in the lengthwise direction along the second material portion, the second material portion including a first surface and an opposing second surface, the material means covering the opening in a manner that the movable member is located between the first fastener element and the second fastener element; and b. closure means which are connected to the movable member for movement therewith in the lengthwise direction, the closure means including (i) means for joining the first and second fastener elements together in a closing mode so as to cover the opening, and (ii) means for separating the first and second fastener elements to permit the lengthwise movement of the movable member between the first and second fastener elements, the joining means including first and second roller members which are spaced apart to rotatably engage the first and second fastener elements so as to urge the first and second fastener elements together in a fastening relationship during the movement of the movable member in the lengthwise direction, the closure means further including (i) a main base which is connected to the movable member for lengthwise movement therewith, and (ii) a support member which is connected to the main base and which supports the first and second roller members at the first surfaces of the first and second material portions, the main base further including an end portion which engages said first and second fastener elements at the second surfaces of the first and second material portions so as to support said first and second fastener elements in engagement with said first and second roller members.

2. The apparatus as set forth in claim 1 wherein:

a. said main base includes a collar which is connected about said movable member, and which guides said first and second fastener elements about said movable member during said lengthwise movement, and b. said closure means includes wedge means which are mounted to said main base between said collar and said first and second roller members so that when said movable member moves in a first lengthwise direction, said first and second roller members join said first and second fastener elements in the closing mode, and when said movable member moves in a second lengthwise direction which is opposite from said first direction, said wedge means cause said first and second fastener elements to separate along an area between said collar and said first and second roller members.

3. The apparatus as set forth in claim 2 wherein said wedge means includes a converging end portion which engages said first and second fastener elements in a manner to cause them to separate when said movable member moves in the second lengthwise direction.

4. The apparatus as set forth in claim 2 wherein:

a. said main base includes first and second ends which are located at opposite sides of said collar on said lengthwise axis;

b. said joining means includes (i) a first pair of said first and second roller members which are mounted to said first end, and (ii) a second pair of said first and second roller members which are mounted to said second end; and c. said separating means includes a first one of said wedge means which are mounted to said first end, and a second one of said wedge means which mounted to said second end, in a manner that movement of said movable member in the first lengthwise direction causes (i) said wedge means at the first end to separate said first and second fastener elements, and (ii) the first pair of said roller members at the second end to join said first and second fastener elements, and movement of said movable member in the second lengthwise direction causes said wedge means at the second end to separate said first and second fastener elements and the second pair of said roller members at the first end to join said first and second fastener elements.

5. Apparatus for covering an opening in an aircraft, the aircraft including a movable member which moves in a lengthwise direction in the opening to move an airfoil member of the aircraft, the apparatus comprising:

a. material means for covering the opening, the material means including (1) a first material portion which has a first fastener element which is located in the lengthwise direction along the first material portion, and (2) a second material portion which has a second fastener element which is located in the lengthwise direction along the second material portion, the material means covering the opening in a manner that the movable member is located between the first fastener element and the second fastener element; and b. closure means which are connected to the movable member for movement therewith in the lengthwise direction, the closure means including (i) means for joining the first and second fastener elements together in a closing mode so as to cover the opening, the joining means including first and second roller members which are spaced apart to rotatably engage the first and second fastener elements so as to urge the first and second fastener elements together in a connected relationship in a manner that the first roller member engages the first fastener element and the second roller member engages the second fastener element so as to displace the first and second fastener elements in a generally transverse direction during the movement of the movable member in the lengthwise direction, and (ii) means for separating the first and second fastener elements to permit the lengthwise movement of the movable member between the first and second fastener elements.

6. Apparatus for covering an opening, the opening containing therein a member which is movable in a generally lengthwise direction within the opening, the apparatus comprising:

a. material means for covering the opening, the material means including (1) a first material portion which has a first fastener element which is located in the lengthwise direction along the first material portion, and (2) a second material portion which has a second fastener element which is located in the lengthwise direction along the second material portion, the material means covering the opening in a manner that the movable member is located between the first fastener element and the second fastener element; and b. closure means which are connected to the movable member for movement therewith in the lengthwise direction, the closure means including (i) a main base, (ii) means for joining the first and second fastener elements together in a closing mode so as to cover the opening, the joining means including first and second roller members which are spaced apart to rotatably engage the first and second fastener elements so as to urge the first and second fastener elements together in a fastening relationship in a manner that the first roller member engages the first fastener element and the second roller member engages the second fastener element to displace the first and second fastener elements in a generally transverse direction during the movement of the movable member in the lengthwise direction, the first and second roller members each including a planar surface, the first roller member being connected to the main base in a manner that the first roller member rotates in a plane which forms an acute angle with the first material portion so as to minimize contact of the planar surface with the first material portion, and the second roller member being connected to the main base in a manner that the second roller member rotates in a plane which forms an acute angle with the second material portion so as to minimize contact of the planar surface of the second roller member with the second material portion, and (iii) means for separating the first and second fastener elements to permit the lengthwise movement of the movable member between the first and second fastener elements.

7. The apparatus as set forth in claim 6 wherein said first and second fastener elements are zipper tracks which interlock in the closing mode.

8. The apparatus as set forth in claim 6 wherein said first and second fastener elements are magnetic strips which magnetically couple in the closing mode.

9. The apparatus as set forth in claim 6 wherein said first and second fastener elements are hook and loop fasteners which engage in the closing mode.

10. Apparatus for covering an opening, the opening containing therein a member which is movable in a generally lengthwise direction within the opening, the apparatus comprising:
    a. material means for covering the opening, the material means including
        (1) a first material portion which has a first fastener element which is located in the lengthwise direction along the first material portion, and
        (2) a second material portion which has a second fastener element which is located in the lengthwise direction along the second material portion, the material means covering the opening in a manner that the movable member is located between the first fastener element and the second fastener element; and
    b. closure means which are connected to the movable member for movement therewith in the lengthwise direction, the closure means including (i) a main base, (ii) means for joining the first and second fastener elements together in a closing mode so as to cover the opening, the joining means including first and second roller members which are spaced apart to rotatably engage the first and second fastener elements so as to urge the first and second fastener elements together in a fastening relationship in a manner that the first roller member engages the first fastener element and the second roller member engages the second fastener element to displace the first and second fastener elements in a generally transverse direction during the movement of the movable member in the lengthwise direction, the first and second roller members each including a recessed circumferential surface for engaging the first and second fastener elements, each recessed circumferential surface being formed by first and second circumferential edges in a manner that the first edge has a larger radius than the second edge to engage the first and second fastener elements between the main base and the first circumferential edge, and (iii) means for separating the first and second fastener elements to permit the lengthwise movement of the movable member between the first and second fastener elements.

11. Apparatus for covering an opening, the apparatus comprising:
    a. material means for covering the opening, the material means including
        (1) a first material portion which has a first fastener element which is located in the lengthwise direction along the first material portion, and
        (2) a second material portion which has a second fastener element which is located in the lengthwise direction along the second material portion; and
    b. closure means including (i) a main base, (ii) means for joining the first and second fastener elements together in a closing mode so as to cover the opening, the joining means including first and second roller members which are spaced apart to rotatably engage the first and second fastener elements in a manner that the first roller member engages the first fastener element and the second roller member engages the second fastener element to displace the first and second fastener elements in a generally transverse direction to join the first and second fastener elements during movement of the closure means in the lengthwise direction, and (iii) means for separating the first and second fastener elements to uncover the opening, the separating means including third and fourth roller members which are rotatably connected to the main base so that the third roller member engages the first fastener element and the second roller member engages the second fastener element.

12. Apparatus for covering an opening, the apparatus comprising:
    a. material means for covering the opening, the material means including
        (1) a first material portion which has a first fastener element which is located in the lengthwise direction along the first material portion, and
        (2) a second material portion which has a second fastener element which is located in the lengthwise direction along the second material portion; and
    b. closure means including (i) a main base, (ii) means for joining the first and second fastener elements together in a closing mode so as to cover the opening, the joining means including first and second roller members which are spaced apart to rotatably engage the first and second fastener elements in a manner that the first roller member engages the first fastener element and the second roller member engages the second fastener element so as to displace the first and second fastener elements in a generally transverse direction to join the first and second fastener elements during movement of the closure means in the lengthwise direction, and (iii) means for separating the first and second fastener elements to uncover the opening, the separating means including a third roller member which engages the first fastener element and a fourth roller member which engages the second fastener element, the third and fourth roller members being rotatably mounted in a parallel manner, one above the other, to the main base, and titled relative to the main base so that the third roller member engages the first fastener element and the fourth roller member engages the second fastener element.

13. In an aircraft having an opening, apparatus comprising in combination:
   a. a movable member which moves in a lengthwise direction in the opening to move an airfoil member of the aircraft;
   b. material means for covering the opening, the material means including
      (1) a first material portion which has a first fastener element which is located in the lengthwise direction along the first material portion, and
      (2) a second material portion which has a second fastener element which is located in the lengthwise direction along the second material portion, the material means covering the opening in a manner that the movable member is located between the first fastener element and the second fastener element; and
   c. closure means which are connected to the movable member for movement therewith in the lengthwise direction, the closure means including (i) means for joining the first and second fastener elements together in a closing mode so as to cover the opening, the joining means including first and second roller members which are spaced apart to rotatably engage the first and second fastener elements so as to urge the first and second fastener elements together in a connected relationship in a manner that the first roller member engages the first fastener element and the second roller member engages the second fastener element so as to displace the first and second fastener elements in a generally transverse direction during the movement of the movable member in the lengthwise direction, and (iii) means for separating the first and second fastener elements to permit the lengthwise movement of the movable member between the first and second fastener elements.

* * * * *

UNITED STATES PATENT AND TRADEMARK OFFICE
CERTIFICATE OF CORRECTION

PATENT NO. : 4,979,702

DATED : December 25, 1990

INVENTOR(S) : William L. Franklin

It is certified that error appears in the above-identified patent and that said Letters Patent is hereby corrected as shown below:

On the title page:

Insert after "Inventor: William L. Franklin,
              22029 - 49th Ave. S.E.
              Bothell, Wash. 98021"

the following:

- - Assignee: The Boeing Company, Seattle, Wash. --.

Signed and Sealed this

Thirteenth Day of October, 1992

*Attest:*

DOUGLAS B. COMER

*Attesting Officer*      *Acting Commissioner of Patents and Trademarks*